United States Patent
Jolliff

(10) Patent No.: US 8,949,096 B2
(45) Date of Patent: Feb. 3, 2015

(54) THREE-DIMENSIONAL TRACER DISPERSION MODEL

(75) Inventor: Jason K. Jolliff, Slidell, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 306 days.

(21) Appl. No.: 13/467,215

(22) Filed: May 9, 2012

(65) Prior Publication Data

US 2013/0304430 A1    Nov. 14, 2013

(51) Int. Cl.
G06G 7/50 (2006.01)
G06F 17/50 (2006.01)

(52) U.S. Cl.
CPC ................... G06F 17/5018 (2013.01)
USPC ......................... 703/9; 703/2; 703/5

(58) Field of Classification Search
CPC ............ G06F 2217/16; G06F 17/5018; G06T 2210/24; G01C 13/00; H04L 29/00
USPC ..................................... 703/2, 5, 9
See application file for complete search history.

(56) References Cited

U.S. PATENT DOCUMENTS

| | | | | |
|---|---|---|---|---|
| 5,801,969 A * | 9/1998 | Nagahama | | 703/9 |
| 5,953,239 A * | 9/1999 | Teixeira et al. | | 703/6 |
| 6,356,860 B1 * | 3/2002 | Barnette | | 703/2 |
| 6,424,923 B1 * | 7/2002 | Huyer et al. | | 702/45 |
| 6,721,694 B1 * | 4/2004 | Lambrecht et al. | | 703/2 |
| 6,748,349 B1 * | 6/2004 | Majumdar et al. | | 703/9 |
| 7,542,885 B1 * | 6/2009 | Majumdar | | 703/2 |
| 2006/0074610 A1 * | 4/2006 | Rasmussen et al. | | 703/2 |
| 2010/0094597 A1 * | 4/2010 | Blain et al. | | 703/1 |
| 2010/0312535 A1 * | 12/2010 | Chen et al. | | 703/10 |
| 2012/0089381 A1 * | 4/2012 | Chu et al. | | 703/6 |

OTHER PUBLICATIONS

Kim, T., Khangaonkar, T., An offline unstructured biogeochemical model (UBM) for complex estuarine and coastal environments, Environmental Modelling and Software 31 (2012) 47-63).*
Herzfeld et al. Realistic test cases for limited area ocean modeling, Ocean Modeling 37 (2011) 1-34.*
James, I.D., Modellilng pollution dispersion, the ecosystem and water quality in coastal waters: a review, Environmental Modelling & Software 17 (2002) 363-385.*
Canuto et al. Vertical diffusivities of active and passive tracers, Ocean Modelling 36 (2011) 198-207.*
Dewey, R., Stegen, G., Ozaki, M., Ocean Dispersion of CO2 From a Moving Ship Source, 2000.*

(Continued)

*Primary Examiner* — Mary C Jacob
*Assistant Examiner* — Scott S Cook
(74) *Attorney, Agent, or Firm* — US Naval Research Laboratory; Kathloon Chapman

(57) ABSTRACT

System for solving for the fully three-dimensional advection diffusion reaction (ADR) of dissolved or particulate tracers (biological or chemical materials) in aquatic environments including an input processor and an ADR tracer field processor. Results from a single execution of an ocean circulation model may be used to drive a separate ADR computer simulation and compute a tracer forecast. The velocity fields are not required to be from an ocean circulation model, they could be analysis fields derived from some other source, such as high frequency RADAR observations or satellite-based surface ocean velocity inversion/detection methods.

9 Claims, 6 Drawing Sheets

(56) References Cited

OTHER PUBLICATIONS

Hamilton, J.D., CGI Programming 101 Chapter 2: Perl Variables, Jun. 8, 2000 CGI101.com.*
Jacobson, M.Z., Fundamentals of Atmospheric Modeling, Cambridge University Press 2005, pp. 138.*
Ocean Modeling Discussion dated Mar 7, 2011.*
Zhen-Gang J.I., Hydrodynamics and Water Quality: Modeling Rivers, Lakes, and Estuaries, John Wiley & Sons, Inc. 2008 pp. 43-45.*
Hecht, M.W., Hasumi, H., (eds) Ocean Modeling in an Eddying Regime, American Geophysical Union, 2008 pp. 70-71.*
NOAA, Light travels about 1,000 meters down in the ocean, 2009 http://oceanservice.noaa.gov/facts/light_travel.html.*
Franks et al. Mix it Up, Mix it Down: Intriguing Implications of Ocean Layering, Oceanography vol. 22, No. 1 Mar. 2009 pp. 228-233.*
Garwood et al. Simulation of Drifters in Turbulent Ocean, Naval Research Reviews, vol. L, 1998 p. 9-14.*
Marks, K.M., Smith, W.H.F., Not all bathymetry grids are created equal, Marine Geophysical Researches, GEBCO Special Issue, Aug. 25, 2004.*
General Bathymetric Chart of the Oceans (GEBSO), Gridded bathymetric datat sets, http://www.bodc.ac.uk/data/online_delivery/gebco/.*
NASA Digital Bathymetric Data Base Variable Resolution (DBDB-V) from the U.S. Naval Oceanographic Office (NAVOCEANO), Jan. 9, 2009 http://gcmd.nasa.gov/records/GCMD_DBDBV.html.*
Maltrud, M., Peacock, S., Visbeck, M., On the Possible Long-term Fate of Oil Released in the Deepwater Horizon Incident, Estimated Using Ensembles of Dye Release Simulations, Environ. Res. Lett. T (2010) 035301 (7pp).*
Tullock, R., Hill, C., Jahn, O., Possible Spreading fo Buoyant Plumes and Local Coastline Sensitivities Using Flow Syntheses from 1992 to 2007, Geophysical Monograph Series 195, 2011.*
Price, J.F., Lagrangian and Eulerian Representations of Fluid Flow: Kinematics and Equations of Motion, Jun. 7, 2006.*
Lafore, J.P., J. Stein, N. Asencio, P. Bougeault, V. Ducrocq, J. Duron, C. Fischer, P. Hereil, P. Mascarat, V. Masson, J.P. Pinty, J. L. Redelsperger, E. Richard, J. Vila-Guerau de Arellano (1998), The Meso-NH Atmospehric Simulation System. Part 1: adiabatic formulation and control simulations, Am. Geophysicae 16, 90-109.*
McGillicuddy, D.J., Jr., L.A. Anderson, S.C. Doney, M.E. Maltrud (2003), Eddy-driven sources and sinks of nutrients in the upper ocean: Results from a 0.1 degree resolution model of the North Atlantic, Global Biogeochemical Cycles, vol. 17., No. 2., 1035, doi:10.1029/2002GB001987.*
Oschlies, A. and V. Garcon (1999), An eddy-permitting coupled physical-biological model of the North Atlantic 1. Sensitivity to advection numerics and mixed layer physics, Global Biogeochemical Cycles, vol. 13., No. 1., 135-160.*
Adcroft, A., J.-M. Campin, P. Heimbach, C. Hill, J. Marshall. 2005. MITgcm manual. http://mitgcm.org/sealion/online_documents/manual.html (Adcroft, 2002).*
Maltrud M., F. Bryan, S. Peacock. 2010b. Boundary impulse response functions in a century-long eddying global ocean simulation, Environ Fluid Mech (2010) 10:275-295 (Maltrud, 2010b).*
Molenkamp, C.R. 1968. Accuracy of Finite-Difference Methods Applied to the Advection Equation. Journal of Applied Meterology 7:160-167. (Molenkamp, 1968).*
Tulloch, R., J. Marshall, C. Hill, K. Shafer Smith. 2011b. Scales, Growth Rates, and Spectral Fluxes of Baroclinic Instability in the Ocean. J. Phys. Oceanogr., 41, 1057-1076, doi:10.1175/2011JPO4404.1. (Tullock, 2011b).*

Bakker, A., Lecture 5—Solution Methods: Applied Computational Fluid Dynamics, Fluent Inc. 2002, http://www.bakker.org.*
FLUENT 6.3 Users Guide—25.3.1 Spatial Discretization http://aerojet.engr.ucdavis.edu/fluenthelp/ug/node992.htm.*
Dortch, M.S., Three-Dimensional, Lagrangian Residual Transport Computed From an Intratidal Hydrodynamic Model, Department of the Army, Waterway Experiment Station, Corps of Engineers 3909 Halls Ferry Road, Vicksburg, Mississippi, Nov. 1990.*
Boris, J. P., and D. L. Book, Flux-Corrected Transport. I. Shasta, A Fluid Transport Algorithm That Works, Journal of Computational Physics 11, pp. 38-69, 1973.
Smolarkiewicz, P. K., A Fully Multidimensional Positive Definite Advection Transport Algorithm with Small Implicit Diffusion, Journal of Computational Physics, 54, pp. 325-362, 1984.
Zalesak, S. T., Fully Multidimensional Flux-Corrected Transport Algorithms for Fluids, Journal of Computational Physics, 31, pp. 335-362, 1979.
Blumberg, A. F., and G. L. Mellor, A Description of a Three-Dimensional Coastal Ocean Circulation Model, Three-Dimensional Coastal Ocean Models, AGU, Washington, D.C., pp. 1-16, 1987.
Behrenfeld, M. J., and P. G. Falkowski, Photosynthetic Rates Derived from Satellite-Based Chlorophyll Concentration, Limnology and Oceanography, vol. 42, No. (1), pp. 1-20, Jan. 1997.
Gordon, H. R., and A. Y. Morel, Remote Assessment of Ocean Color for Interpretation of Satellite Visible Imagery: A Review, Lecture Notes on Coastal and Estuarine Studies, Springer-Verlag, New York, pp. 24-36, 1983.
Smolarkiewicz, P. K., and L. G. Margolin, MPDATA: A Finite-Difference Solver for Geophysical Flows, Journal of Computational Physics, 140, pp. 459-480, 1998.
Adcroft, A., J-M. Campin, P. Heimbach, C. Hill, J. Marshall, 2002, MITgcm Manual, http://www.autodiff.org/?module=Publications&submenu=list%20publications&id=adcroft2002tm and http://mitgcm.org/sealion/online_documents/manual.html.
Daru, V. and C. Tenaud, 2004, High Order One-Step Monotonicity-Preserving Schemes for Unsteady Compressible Flow Calculations, Journal of Computational Physics, vol. 193:563-594.
Molenkamp, C.R., 1968, Accuracy of Finite-Difference Methods Applied to the Advection Equation, Journal of Applied Meterology, vol. 7:160-167.
Tulloch, R., J. Marshall, C. Hill, K. Shafer Smith, 2011, Scales, Growth Rates, and Spectral Fluxes of Baroclinic Instability in the Ocean, Journal of Physical Oceanography, vol. 41:1057-1076.
Tulloch, R., C. Hill, O. Jahn, 2013, Possible Spreadings of Buoyant Plumes and Local Coastline Sensitivities Using Flow Syntheses from 1992 to 2007, in Monitoring and Modeling the Deepwater Horizon Oil Spill: A Record-Breaking Enterprise (eds Y. Liu, A. Macfadyen, Z.-G. Ji and R. H. Weisberg), Geophysical Monograph Series 195, American Geophysical Union, pp. 245-255.
Maltrud, M., S. Peacock, M. Visbeck, 2010, On the Possible Long-Term Fate of Oil Released in the Deepwater Horizon Incident, Estimated Using Ensembles of Dye Release Simulations, Environmental Research Letters, vol. 5:1-7.
Price, J.F., 2006, Lagrangian and Eulerian Representations of Fluid Flow: Kinematics and the Equations of Motion, http://ocw.mit.edu/resources/res-12-001-topics-in-fluid-dynamics-spring-2010/online-publication/MITRES_12_001_essay3.pdf, pp. 1-91.
Maltrud, M., F. Bryan, S. Peacock, 2010, Boundary Impulse Response Functions in a Century-Long Eddying Global Ocean Simulation, Environmental Fluid Mechanics, vol. 10:275-295.
Lafore, J.P., J. Stein, N. Asencio, P. Bougeault, V. Ducrocq, J. Duron, C. Fischer, P. Hereil, P. Mascarat, V. Masson, J.P. Pinty, J. L. Redelsperger, E. Richard, J. Vila-Guerau de Arellano (1998), The Meso-NH Atmospheric Simulation System. Part 1: Adiabatic Formulation and Control Simulations, Am. Geophysicae vol. 16:90-109.
McGillicuddy, D.J., Jr., L.A. Anderson, S.C. Doney, M.E. Maltrud (2003), Eddy-Driven Sources and Sinks of Nutrients in the Upper Ocean: Results from a 0.1 Degree Resolution Model of the North Atlantic, Global Biogeochemical Cycles, vol. 17., No. 2., 1035-1054 (4-1 through 4-20).

* cited by examiner

THREE-DIMENSIONAL TRACER DISPERSION MODEL

CROSS-REFERENCE TO RELATED APPLICATIONS

Not applicable.

BACKGROUND

Methods and systems disclosed herein relate generally to ocean modeling, and more specifically to solving for advection diffusion reaction of dissolved or particulate tracers in aquatic environments.

The currents and action of fluid motion are constant environmental perturbations to the wide range of chemical and biological interactions that occur in the ocean. Physical ocean computer models take atmospheric forcing as input and attempt to calculate the future trend of the ocean's physical state, e.g., current speed and direction, turbulence, wave heights, ocean salinity and temperature. These physical model forecasts can help in the scientific study and potentially the forecasting of dissolved and particulate materials in the oceans, coastal domains and estuaries. Biogeochemical modeling takes advantage of the ability of physical ocean models to properly describe and forecast fluid motions. The underlying basis to biogeochemical models is that a simulated field (an array of point material concentrations over a multi-dimensional grid) of some set of biological or chemical constituents is subject to physical transport in ocean currents, that the physical model will adequately describe the advection and diffusion of the materials, and additional terms can be added to describe biological interactions or chemical reactions. Hence biogeochemical models are essentially a description of time-dependent advection diffusion-reaction (ADR) for specified ocean constituents. Dispersion is the action or process of distributing materials over a wide area—specific to fluid dynamics this refers to the combined action of advection and diffusion of dissolved and suspended particulate materials that results in a change in the three-dimensional distribution of these materials over time. It is fundamental to the ADR calculation that the ocean physics is represented, and so the physical ocean circulation models are an integral component of any potential ADR system. A direct way to construct a coupled ADR computer model is to integrate the advection and diffusion of a biological/chemical tracer field directly into the physical ocean computer model software. An additional set of tracers can be added to advection and diffusion computations for temperature and salinity. Additional software code can be added to describe the reactions and interactions of these additional field properties. Direct coupling can present practical concerns to investigations focused on the "reaction" portion of the ADR simulation such as, for example, but not limited to, the fact that biological and ecosystem interactions tend to be both complex and poorly constrained by either first principles or direct observation. As a practical matter, work towards development of prognostic ADR equations requires multiple iterations of various "R" formulations, often with excessively large parameter lists. Setting the complexity of ecosystems aside, even the decay rates for certain dissolved chemical materials may be very poorly constrained. Research in these areas using ADR simulations can require that multiple or "ensemble" sets of computer simulations will be performed. Re-calculating the ocean physics for each simulation can be wasteful and superfluous. Also, source code and forcing fields for the physical ocean model may not be available, and only the results from the physical model (in the form of velocity fields) can be accessible to the investigator. It also may be the case that the extensive computational resources required to execute the physical ocean model are only intermittently available. In these situations, the direct ADR coupling method may not be a pragmatic solution.

An offline coupler of the prior art performs a two-dimensional advection computation (surface only) based on ocean circulation model results, but does not solve for continuity or obey mass conservation. Thus, the offline coupler introduced spurious artifacts into the ADR solution and diminished the apparent quality and utility of the forecast products.

What is needed is a system by which the results from a single execution of an ocean circulation model may be used to drive a separate ADR computer simulation and compute a tracer forecast. What is further needed is a system that does not require that the velocity fields are from an ocean circulation model, they could be analysis fields derived from some other source, such as high frequency RADAR observations or satellite-based surface ocean velocity inversion/detection methods.

SUMMARY

The system of the present embodiment for solving for the fully three-dimensional advection diffusion reaction (ADR) of dissolved or particulate tracers (biological or chemical materials) in aquatic environments can include, but is not limited to including, an input processor receiving, for example, but not limited to, a set of flow fields (East/West and North/South velocity components ideally from a hydrodynamic or ocean circulation model), bathymetric data, an initial property field, and a spatial grid, and an ADR processor solving for the advection-diffusion-reaction of tracers. The ADR processor can provide computational savings for a wide range of forecasting applications and basic oceanographic/aquatic research programs. In particular, the system and method of the present embodiment can obviate the need for integrating the advection-diffusion of tracers directly into the physical models. The ADR processor can combine a numerical advection scheme with previously computed velocity fields, establish of a grid and staggered stencil, and perform iterative adjustments for continuity and mass conservation to compute ADR.

The method of the present embodiment for forecasting a tracer can include, but is not limited to including, the steps of: (a) defining a 2D grid for an area of interest, (b) defining a 3D grid based on the 2D grid and bathymetric data, (c) defining surfaces for each grid point in the 3D grid, (d) defining an initial field over the 3D grid, (e) defining each velocity grid point in the 3D grid by interpolating flow fields to the 3D grid, (f) associating each velocity grid point with at least one of the surfaces, (g) calculating, for example, but not limited to, based on first order upwind differencing, fluid flow through each side of the grid cell over a time step, (h) computing a total flux through each of the surfaces based on the fluid flow, (i) computing a residual mass flux of layers of a water column based on the total flux and the residual mass flux of adjacent of the layers, (j) iteratively computing a residual velocity of the layers based on the residual mass flux, (k) computing adjusted flow fields by removing the residual velocities from the velocity grid points; and (l) performing time-dependent advection/diffusion calculation to create the tracer forecast based on the adjusted flow fields. The method depends on defining the specific area of each side of the grid cell, because that's how the flow field calculation is adjusted. U and V velocity components are associated with each grid point, and each velocity component is associated with a grid surface.

The method can optionally include the steps of determining remaining of the residual velocities in the adjusted flow fields, if the remaining residual velocities are above a continuity threshold, receiving updated of the flow fields; and repeating steps (e)-(l). The method can further optionally include the step of storing the spacing of each grid cell as either a scalar for constant spacing or an array for irregular spacing. The area of interest can include, but is not limited to including, the upper two hundred meters of the water column. The bathymetric data resolution of the bathymetric data can include the 2D grid resolution of the 2D grid. A sigma-style vertical coordinate can be a fraction of the water column, for example, but not limited to, 1/29th of the depth of the water column or 200 meters. The step of defining surfaces for each grid point in the 2D grid can include, but is not limited to including, the step of interpolating a simulated finite volume around each grid point in the 3D grid over the bathymetry data, if the bathymetry data is not flat. The initial field can include, but is not limited to including, point concentrations over the 3D grid.

The method for adjusting flow fields in a 2D grid can include, but is not limited to including, the steps of accessing ocean flow fields and associated bathymetric data, interpolating the flow fields to the 2D grid, calculating residuals for each water column associated with the flow fields and the bathymetric data, and iteratively adjusting the flow fields by removing the residuals.

The system for forecasting a tracer can include, but is not limited to including grid/surface processor defining a 2D grid for an area of interest, a 3D grid based on the 2D grid and bathymetric data, surfaces for each grid point in the 3D grid, and an initial field over the 3D grid, velocity grid point processor defining each velocity grid point in the 3D grid by interpolating flow fields to the 3D grid and associating each velocity grid point with at least one of the surfaces, and flux processor computing a total flux through each of the surfaces based on the velocity grid points. The system can further include residual processor computing a residual mass flux of the layers of a water column based on the total flux and the residual mass flux of adjacent of the layers, and iteratively computing a residual velocity of the layers based on the residual mass flux, flow field processor calculating fluid flow through each side of the grid cell over a time step, and adjusting the flow fields by removing the residual velocities from the velocity grid points, velocity receiver receiving velocity components if the adjusted flow fields have an absolute residual velocity above a continuity threshold, and tracer field processor performing time-dependent advection/diffusion calculation to create the tracer forecast based on the adjusted flow fields. The velocity grid point processor can access the flow fields from a hydrodynamic circulation model, the bathymetric data, the initial field, and the 2D grid for the area of interest.

BRIEF DESCRIPTION OF THE DRAWINGS

FIG. 6 is a diagram of a horizontal indexed grid.

DETAILED DESCRIPTION

These solutions and other advantages are achieved by the various embodiments of the teachings described herein below.

Figure 1:
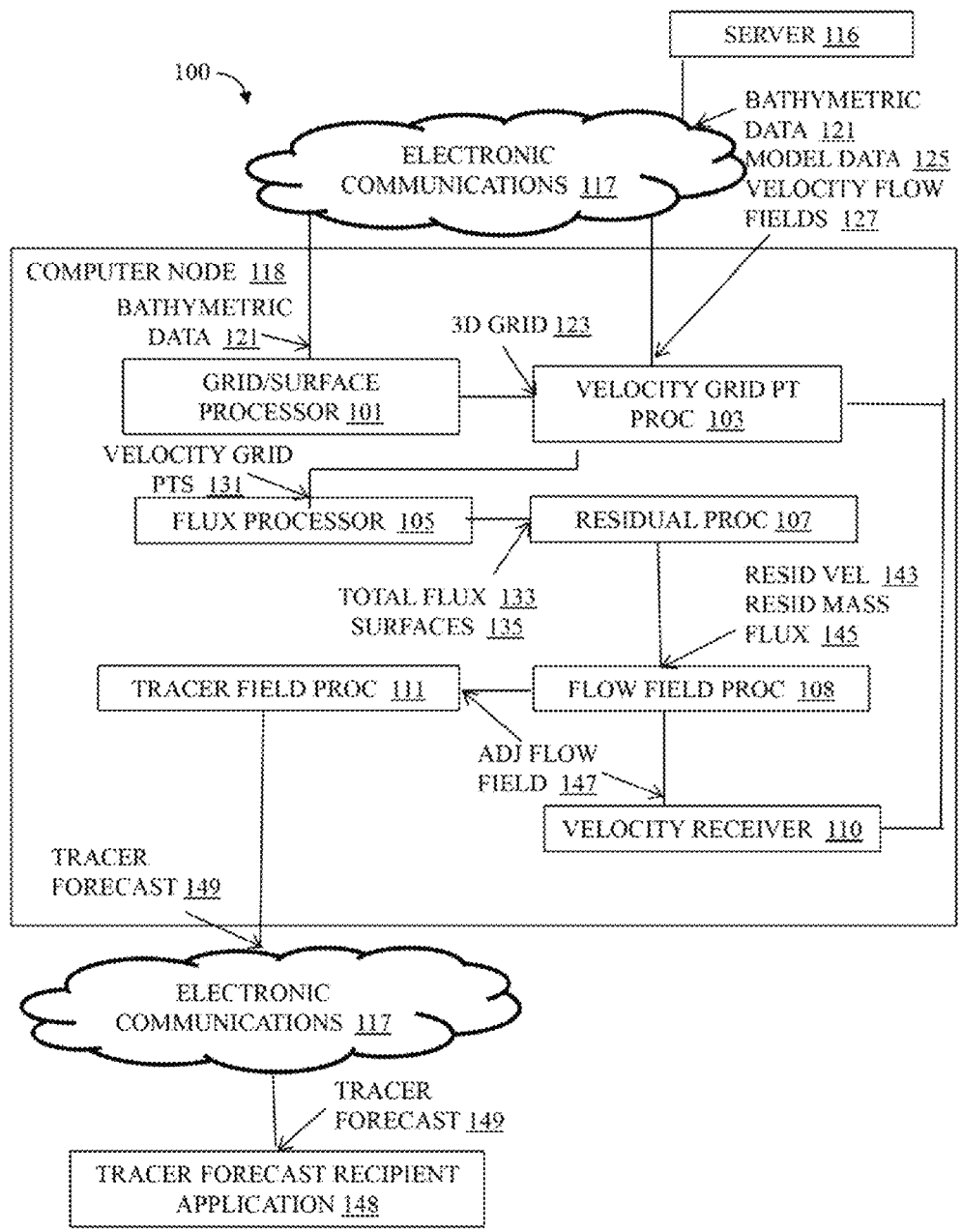
FIG. 1 is a schematic block diagram of the system of the present embodiment.

Referring now to FIG. 1, system 100 for forecasting a tracer can include, but is not limited to including, grid/surface processor 101 defining a 2D grid for an area of interest, 3D grid 123 based on the 2D grid and bathymetric data 121 received from, for example, but not limited to server 116 through electronic communications 117, surfaces 135 for each grid point in 3D grid 123, and an initial field over 3D grid 123, velocity grid point processor 103 defining each velocity grid point 131 in 3D grid 123 by interpolating flow fields 127 to 3D grid 123 and associating each velocity grid point 131 with at least one of surfaces 135, and flux processor 105 computing total flux 133 through each of surfaces 135 based on velocity grid points 131. System 100 can further include residual processor 107 computing residual mass flux 145 of layers of a water column based on total flux 133 and residual mass flux 145 of adjacent of the layers, and iteratively computing residual velocity 143 of the layers based on residual mass flux 145, flow field processor 108 calculating fluid flow through each side of a grid cell of surfaces 135 over a time step, and adjusting the flow fields by removing residual velocities 143 from velocity grid points 131, velocity receiver 110 receiving velocity flow fields 127 if adjusted flow fields 147 have an absolute residual velocity above a continuity threshold, and tracer field processor 111 performing time-dependent advection/diffusion calculation to create tracer forecast 149 based on adjusted flow fields 147 and provide them to, for example, tracer forecast recipient application 148 through, for example, electronic communications 117. The velocity grid point processor can access flow fields 127 from model data 125 (for example, but not limited to, hydrodynamic circulation model data), bathymetric data 121, the initial field, and the 2D grid for the area of interest.

Figure 2:
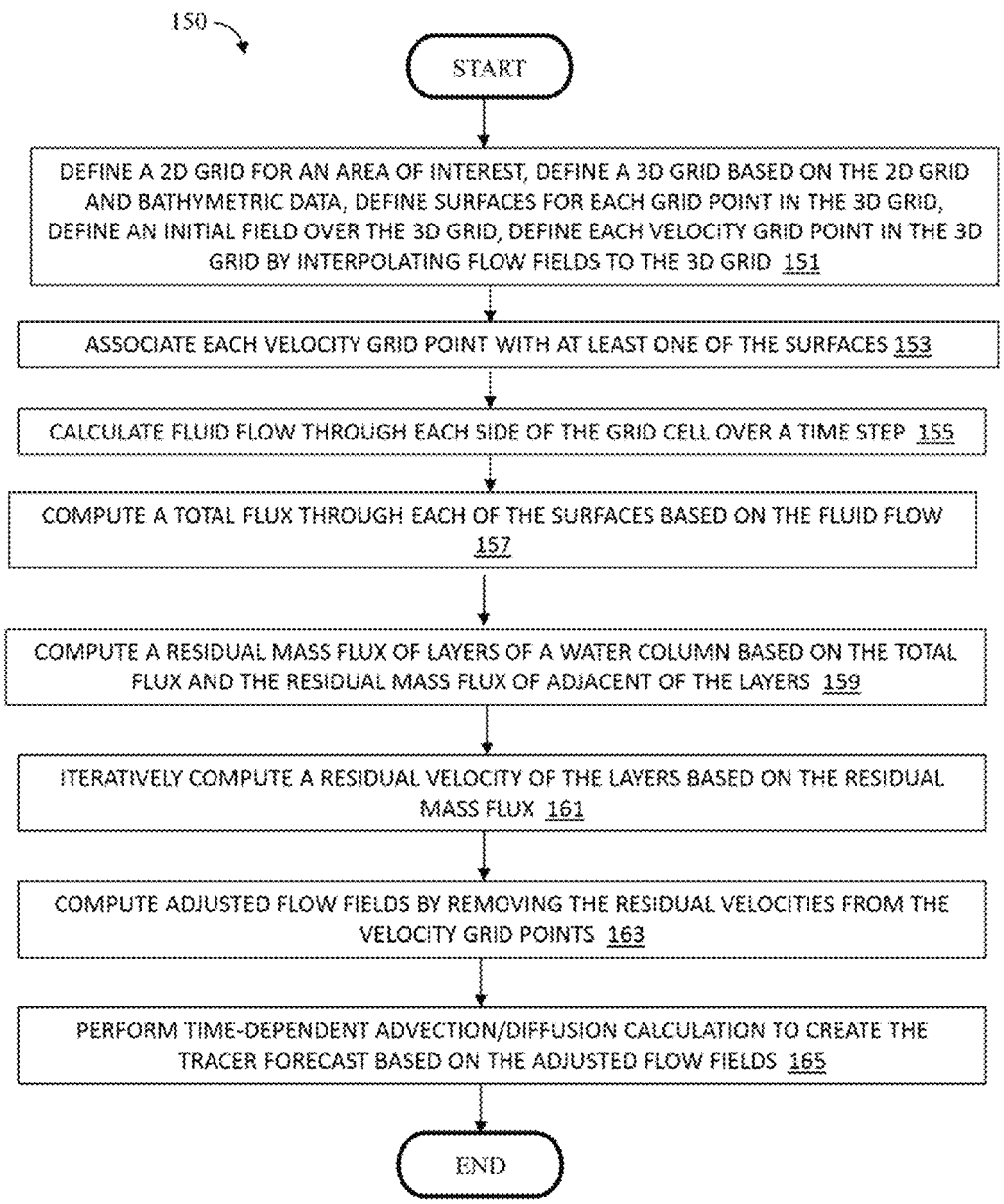
FIG. 2 is a flowchart of the method of the present embodiment.

Referring now to FIG. 2, method 150 for forecasting a tracer include, but is not limited to including, the step of (a) defining 151 a two-dimensional grid, for example, but not limited to, in reference to a Cartesian XY domain where the X corresponds to East/West and the Y corresponds to North/South, or another geospatial coordinate system in which the spacing of each grid cell in 2-dimensions is stored as a scalar (for constant spacing) or an array (for irregular spacing). Method 150 can further include the step of (b) defining a three-dimensional grid with the two-dimensional grid as a basis, using, for example, but not limited to, bathymetry for coastal applications. Computations can occur in the upper two hundred meters of the water column, for example. For relatively shallow water, for example, less than 200 meters in depth, a bathymetry file at the resolution of the two-dimensional grid can be used. A sigma-style vertical coordinate can be designated as a fraction of the vertical depth, for example, but not limited to, $1/29^{th}$ of the vertical depth, or two hundred meters, whichever is less. Thus each horizontal X/Y grid location can have twenty-nine vertical layers regardless of the true depth. In the present embodiment, the maximum thickness of each depth increment is ~6.9 meters.

Figure 3:
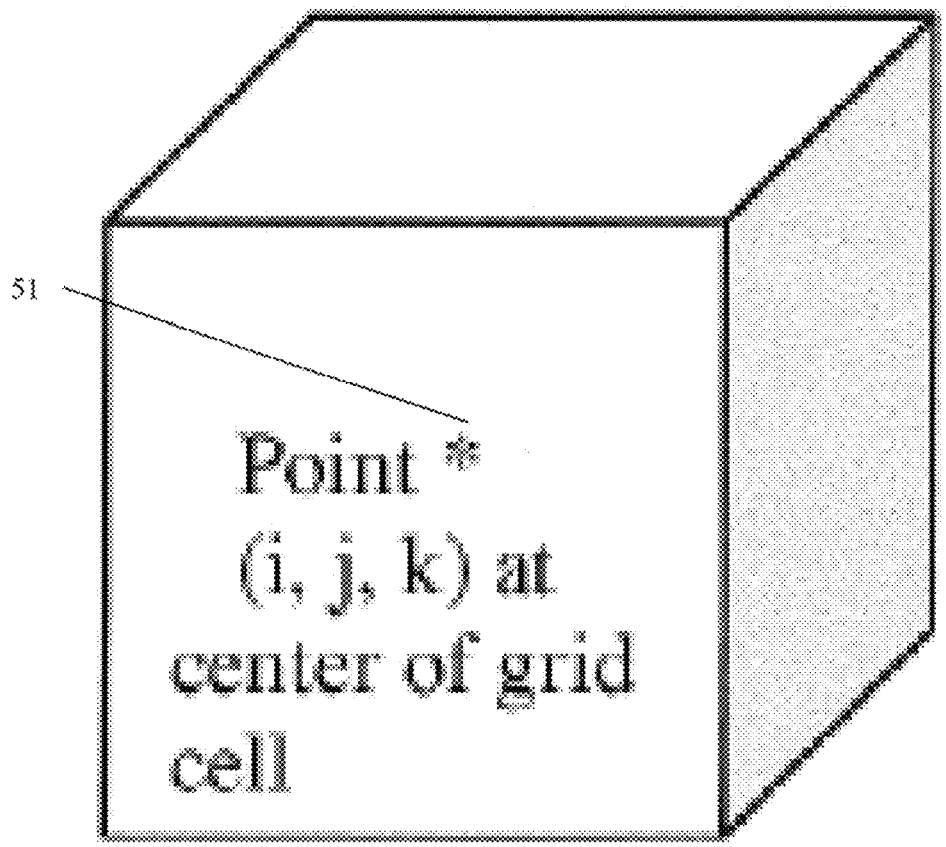
FIG. 3 is a diagram of a grid cell of the present embodiment.

Referring now to FIG. 3, a fully discretized volume of ocean can be defined with grid locations corresponding to center 51 of each individual volume (i,j,k). The volume need not be rectangular, but the area of each volume face needs to be defined via dx, dy, and dz at each (i,j,k) location in the three-dimensional array.

Referring again to FIG. 2, method 150 can further include the step of (c) defining the surface areas for the three-dimensional grid by interpolating the stencil (referred to herein interchangeably as "grid cell") (the simulated finite volume) around each grid point (i,j,k) over the bathymetry, if the bathymetry is not flat. The depth of the Y grid cell can be taken as the mean of the depths in the X direction, and vice-versa. Over varying topography, the stencils may not be perfectly rectangular. Areas of land (land boundaries) may be identified and consistent with the bathymetry file. Each point in the grid (i,j,k) can be associated with a six-sided surface area. These surface areas can be used in the velocity adjustment computations described later. Method 150 can still further include the step of (d) defining the initial field given, for example, but not limited to, as point concentrations (mass per unit volume) over the three-dimensional grid. The initial field could be derived from, for example, but not limited to, observations, an analysis field, or a combination of data and model results or objective analysis. Method 150 can even further include the step of (e) interpolating flow fields (horizontal velocities, m/s) accessed from, for example, but not limited to, an ocean circulation model, to the three-dimensional grid so each (i,j,k) location is defined by two velocity components (U—East/West, and V—North/South). Method 150 can include the step of vertically interpolating parameters if the ocean model is given in standard z-depth surfaces (e.g., 5, 10, 15, 20, . . . 200 meters). If, however, the results are retained from a sigma-style ocean model coordinate system, method 150 can include the step of repeating step (c) so the grids are consistent with one another and minimal vertical interpolation is required. If only surface velocities are available, method 150 can include the step of interpolating the surface velocities to depth by, for example, but not limited to, applying an attenuating (to a zero flow bottom velocity) function or assuming a homogenous velocity field.

Figure 4:
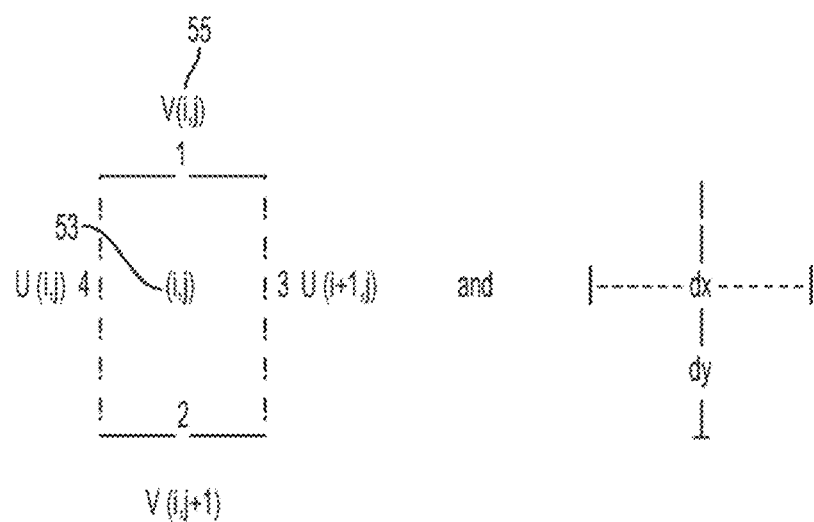
FIG. 4 is a diagram of horizontal grid sides associated with vertical grid sides for each velocity component.

Referring now to FIGS. 2 and 4, as established in step (c) of defining the surface areas for the grid, each grid cell has four vertical sides and two horizontal sides. For a horizontal i, j location 53 (FIG. 4), method 150 (FIG. 2) can include the step of (f) associating 153 (FIG. 2) each velocity component 55 (FIG. 4) with a side that is labeled 1, 2, 3, or 4 following the convention shown, thus associating each surface area with a staggered velocity component as shown in FIG. 4. Method 150 can further include the steps of, wherever the horizontal grid is associated with a land boundary (as established in the bathymetry file of step (b)) forcing the initial component boundary velocities to zero, and (g) calculating 155 (FIG. 2), based on first order upwind differencing, the fluid flow through each side of the grid cell over the specified time step (the time step, dt, is, for example, but not limited to, 360 seconds). For example, the mass flux F through side 4 (FIG. 4) per unit time is computed as either:

F(4)=U(i,j,k) dy(i,j,k)dz(i,j,k) T(i−1,j,k) if U(i,j,k)>0.0 (a mass flux into the cell) or F(4)=U(i,j,k) dy(i,j,k)dz(i,j,k) T(i,j,k) if U(i,j,k)<0.0 (a mass flux out of the cell)

where U is the velocity (meters per second m/s), dy is the length of side 4 in meters, dz is the height of the grid cell in meters, and T(i,j,k) is the concentration of tracer materials (mass per unit volume; mass per cubic meter, $m^{-3}$) in the cell (for U<0.0, this material is exiting through side 4) or T(i−1, j,k) is the mass per unit volume in the cell adjacent (for U>0.0, this material is entering through side 4). The product of the units (m $s^{-1}$*s*m*m*mass $m^{-3}$)

leaves mass per unit time, so F(4) is the flux of mass through that side. Method 150 includes step (h) computing 157 a total flux through each of the surfaces based on the fluid flow.

A similar "upwind" scheme can be applied to the remaining sides:

F(1)=V(i,j,k) dx(i,j,k)dz(i,j,k)T(i,j−1,k), if V(i,j,k)>0.0 or
F(1)=V(i,j,k) dx(i,j,k)dz(i,j,k) T(i,j,k), if V(i,j,k)<0.0
F(2)=−V(i,j+1,k) dx(i,j,k)dz(i,j,k) T(i,j,k), if V(i,j+1,k)>0.0 or
F(2)=−V(i,j+1,k) dx(i,j,k)dz(i,j,k) T(i,j+1,k), if V(i,j+1,k)<0.0
F(3)=−U(i+1,j,k) dy(i,j,k)dz(i,j,k) T(i,j,k), if U(i+1,j,k)>0.0
F(3)=−U(i+1,j,k) dy(i,j,k)dz(i,j,k) T(i+1,j,k), if U(i+1,j,k)<0.0

Method 150 can further include the step of (i) computing 159 the residual mass flux for the grid cell as the sum of all four sides:

R(i,j,k)=F(1)+F(2)+F(3)+F(4)

Based on laws of continuity and conservation of mass:

0=F(1)+F(2)+F(3)+F(4)−R(i,j,k)

Figure 5:
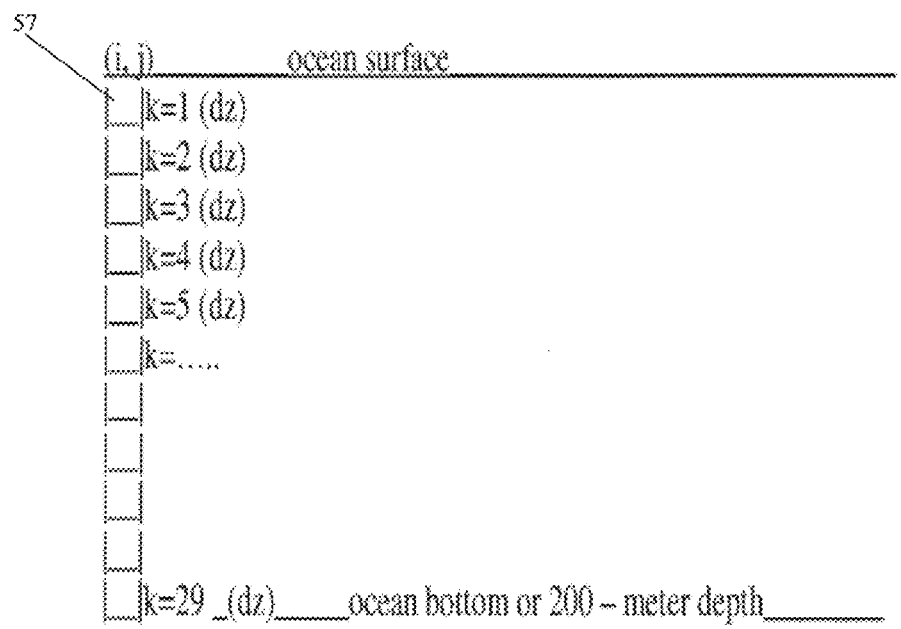
FIG. 5 is grid cell representation of a water column over a finite horizontal space and vertical depth.

Referring now to FIG. 5, to establish continuity independent of the tracer field (T(i,j,k)), and if the grid cell area (dx*dy) is constant for the water column centered on point k, method 150 can include the step of (j) computing 161 a residual velocity (m/s) that incorporates the geometry of the grid cell based on the residual mass flux computation:

F*(1)=V(i,j,k) dz $dy^{-1}$
F*(2)=−V(i,j+1,k) dz $dy^{-1}$
F*(3)=−U(i+1,j,k) dz $dx^{-1}$
F*(4)=U(i,j,k) dz $dx^{-1}$
R*(i,j,k)=F*(1)+F*(2)+F*(3)+F*(4)

Since the fluxes through sides (1-4) are associated with horizontal velocities (U and V), the residual velocity (R*) is associated with a vertical velocity (i.e., the rate of fluid movement in the vertical direction).

Referring now to FIG. 5, column 57 of grid cells represents a column of water in the ocean over a finite horizontal space (dx, dy) and vertical depth (dz). The ocean surface can be, for example, but not limited to, mean sea level and a closed boundary, or there could be variations in sea surface height. By iteratively computing the residual velocity R*, beginning from k=1 and presuming (1) the incompressibility of water, and (2) a closed surface, then for the remaining grid cells in column 57, the residual velocity is the sum of the four vertical fluxes and preceding residual velocity from the overlying grid cell:

R*(i, j, k=2, 3, 4, . . . 29)=F*(1)+F*(2)+F*(3)+F*(4)+R*(k−1)

For k=1 there is no overlying grid cell and so there is no R* term on the right hand side of the equation. The convention here is from top of the water column to bottom, but it may be reversed under the same assumptions: there is no flow from the below the water column into the water column.

For the last (bottom) grid cell, R*(k)=0 since water cannot be pushed through or drawn up from the seafloor. In other words, the entire water column obeys the continuity equation:

$$\frac{\partial w}{\partial z} = -\left(\frac{\partial u}{\partial x} + \frac{\partial v}{\partial y}\right)$$

Violation of continuity can result in error in the advection computation and negative values of the tracer field. A solution that does not impose continuity, for example, but not limited to, a reflexive or periodic bottom boundary condition, can violate the principle of mass conservation (i.e., materials can be spuriously removed or introduced into the tracer field).

The water column residual, $R^*(k=29)$, can then be forced to near zero values (acceptable machine values of near zero). This residual velocity is added (or subtracted) from the velocities incorporated into the mass flux calculations for the water column. There are two considerations: (1) large changes in any particular velocity component at any depth level may significantly alter the original flow fields; and (2) modification to the velocities for one water column location (i,j) can impact the adjacent water column velocities, and thus the entire grid because of the way the velocities are associated with each side of the stencil (see FIG. 4). One solution is to (1) break up the residual velocity over two water column sides, twenty-nine vertical levels each (or N vertical levels), so each velocity component is modified by $\frac{1}{58}^{th}$ (or $1/(2*N)$) of the residual velocity, which can be a shift in the surface velocity fields, and (2) spatially iterate the modifications through the grid so the integrity of each water column continuity calculation is maintained after each adjustment.

Figure 6:
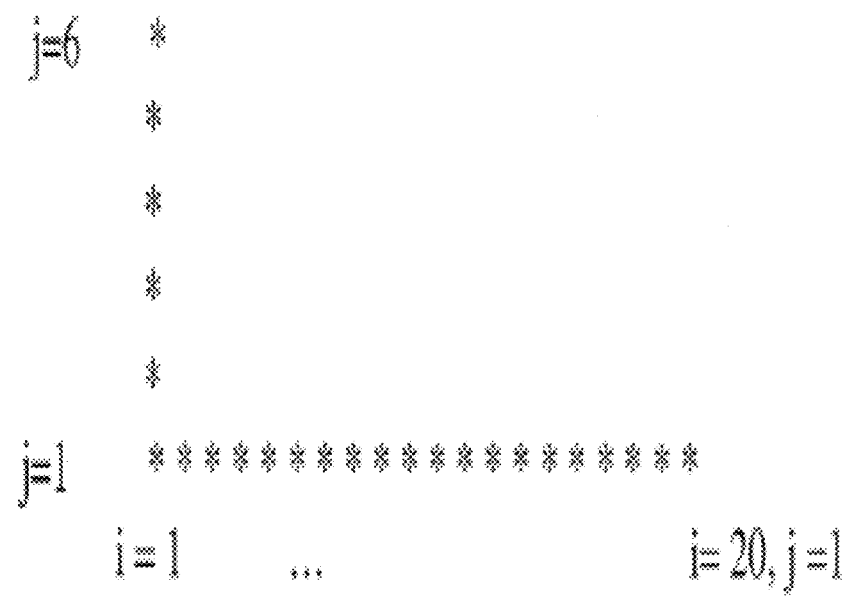

Referring now to FIG. 6, for example, in a horizontal grid over the range i=1–20 and j=1–6, the residual velocities can be adjusted on sides 2 and 3 (from FIG. 4) and the adjustment can iterate through the grid from i=1 to i=20 and from j=6 to j=1 (left to right and top to bottom). Steps in this process are as follows: the flow fields are interpolated to the grid, the residuals are calculated for each water column (i,j), and the residuals are removed by iterative adjustment to the component velocities on the specified sides of the grid stencil, which is step (k) 163 in method 150 (FIG. 2). Method 150 (FIG. 2) can include the step of (1) performing 165 time-dependent advection/diffusion calculation to create the tracer forecast based on the adjusted flow fields.

Method 150 (FIG. 2) can optionally include the step of checking the adjusted flow fields for remaining residual velocities. If an absolute residual velocity is detected above a continuity threshold, for example, but not limited to, 1.0E-16 m/s, then method 150 can optionally include the step of receiving a new set of velocity components. Method 150 can further optionally include the step calculating the vertical velocities (w, m/s) from the adjusted horizontal velocity components. The fully three-dimensional arrays of adjusted and continuity-respecting flow fields can be used for advection calculations.

Method 150 can still further include the step of subjecting the tracer field to the three-dimensional upwind differencing advection calculation. Additional reaction calculations ranging from first order decay rate constants to biogeochemical or ecosystem models can be inserted. Optionally, the numerical advection scheme used in this step may be changed without impacting the continuity adjustment scheme presented in previous steps. Method 150 can also optionally include the steps of writing the results to output file(s) and repeating the process for a new set of flow fields and the updated tracer field.

At least three methods can be used for dealing with land boundaries: (1) allow the adjusted exchanges through the land boundary, (2) designate grid cells directly adjacent to land cells as boundary points, and (3) modify the flux adjustment scheme so the adjusted sides are never coincident with a land boundary. With respect to (1), this method is not strictly mass conservative, but the mass flux calculation departures from 0 at the boundary are generally small. With respect to (2), this method is accomplished by labeling the land boundary points and not updating them in the advection routine after the flux computations have been performed. With respect to (3), this method is applicable for grid geometries such as, for example, but not limited to, straight coastlines.

With respect to ocean boundaries, in the present embodiment, the outer most points along the array perimeter are treated as boundary values—materials may flux out into these points or flux back into the domain, and the tracer values can be held constant, for example. Other schemes can be used.

With respect to diffusion, the adjusted flow fields can be used to derive a first-order numerical advection scheme that is inherently diffusive. Due to this implicit numerical diffusion, additional diffusion computations may not be required to be performed. Higher order and less diffusive numerical schemes, perhaps including turbulence closure schemes and diffusive calculations, may be used to replace the present scheme outlined above.

With respect to upwind differencing higher order advection schemes can be used in the system of the present embodiment. In addition, other iterative variations of the flow field adjustments are possible including, for example, adjusting sides 1 and 2 while iterating right to left and bottom to top, and adjusting only one side of the water column. The order of the adjustment and the sequence of the iteration can be modified.

Embodiments of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. In an exemplary embodiment, the software for the system can be written in any programming language. The system can operate on a computer having a variable number of CPUs. Other alternative computer platforms can be used. The operating system can be, for example, but is not limited to, WINDOWS® or LINUX®.

The present embodiment is also directed to software for accomplishing the methods discussed herein, and computer readable media storing software for accomplishing these methods. The various modules described herein can be accomplished on the same CPU, or can be accomplished on different computers. In compliance with the statute, the present embodiment has been described in language more or less specific as to structural and methodical features. It is to be understood, however, that the present embodiment is not limited to the specific features shown and described.

Referring again primarily to FIG. 2, method 150 can be, in whole or in part, implemented electronically. Signals representing actions taken by elements of system 100 (FIG. 1) and other disclosed embodiments can travel over at least one live communications network 117 (FIG. 1). Control and data information can be electronically executed and stored on at least one computer-readable medium. The system can be implemented to execute on at least one computer node 118 (FIG. 1) in at least one live communications network 117 (FIG. 1). Common forms of at least one computer-readable medium can include, for example, but are not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read.

Although the present teachings have been described with respect to various embodiments, it should be realized these teachings are also capable of a wide variety of further and other embodiments.

What is claimed is:

1. A computer method for forecasting characteristics that can be approximated by mass concentration of a tracer in an incompressible fluid comprising:
    (a) defining, by use of a specially-programmed computer, a 2D spatial grid for an area of interest in the incompressible fluid;
    (b) defining, by use of the specially-programmed computer, a 3D spatial grid based on the 2D spatial grid and bathymetric data;
    (c) defining, by use of the specially-programmed computer, surfaces for each grid point in the 3D spatial grid, the surfaces in combination creating a plurality of grid cells;
    (d) defining, by use of the specially-programmed computer, an initial concentration of mass for each of the grid cells over the 3D spatial grid;
    (e) defining, by use of the specially-programmed computer, the velocity at each of the grid points in the 3D spatial grid by interpolating a pre-selected spatial 3D flow field to the 3D spatial grid;
    (f) calculating, by use of the specially-programmed computer, and using a first order upwind differencing scheme, fluid flow through each of the surfaces based on the velocities at each of the grid points;
    (g) computing, by use of the specially-programmed computer, a total flux through each of the surfaces based on the fluid flow;
    (h) computing, by use of the specially-programmed computer, a residual mass flux of layers of a water column based on the total flux and the residual mass flux of adjacent of the layers, the residual mass flux including residual velocities above a continuity threshold;
    (i) computing, by use of the specially-programmed computer, adjusted flow fields by removing the residual velocities from the velocities;
    (j) performing, by use of the specially-programmed computer, time-dependent advection/diffusion calculation to compute the concentration forecast based on the adjusted flow fields;
    (k) determining remaining of the residual velocities in the adjusted flow fields;
    (l) if the remaining residual velocities are above the continuity threshold, updating the spatial 3D flow field; and
    (m) repeating steps (e) through (l).

2. The method as in claim 1 further comprising:
    storing the spacing of each of the grid cells as either a scalar for constant spacing or an array for irregular spacing.

3. The method as in claim 1 wherein the area of interest comprises 50-3000 meters of the water column.

4. The method as in claim 1 wherein the bathymetric data comprise a bathymetric data resolution of a 2D grid resolution of the 2D spatial grid.

5. The method as in claim 1 further comprising:
    designating a vertical coordinate as a fraction of the depth of the water column.

6. The method as in claim 1 wherein the defining surfaces for each grid point in the 3D spatial grid comprises:
    interpolating a simulated finite volume around each grid point in the 3D spatial grid over the bathymetry data, if the bathymetry data is not flat.

7. The method as in claim 1 wherein the initial concentration of mass for each of the grid cells comprises point concentrations over the 3D spatial grid.

8. A computer system for forecasting characteristics that can be approximated by mass concentration of a tracer comprising:
    a computer programmed to execute a grid/surface processor defining a 2D spatial grid for an area of interest in an incompressible fluid, a 3D spatial grid based on the 2D spatial grid and bathymetric data, surfaces for each grid point in the 3D spatial grid, the surfaces in combination creating a plurality of grid cells, and an initial concentration of mass for each of the grid cells over the 3D spatial grid;
    a computer programmed to execute a velocity grid point processor defining the velocity at each of the grid points in the 3D spatial grid by interpolating a pre-selected spatial 3D flow field to the 3D spatial grid;
    a computer programmed to execute a vertical flux processor computing a total flux through each of the surfaces based on the fluid flow;
    a computer programmed to execute a residual processor computing a residual mass flux of the layers of a water column based on the total flux and the residual mass flux of adjacent of the layers, the residual mass flux including residual velocities;
    a computer programmed to execute a flow field processor calculating, using a first order fluid flow through each of the surfaces based on the velocities at each of the grid points, and adjusting the flow fields by removing the residual velocities from the velocities, the flow field processor determining remaining of the residual velocities in the adjusted flow fields and, if the remaining residual velocities are above a continuity threshold, updating the spatial 3D flow field, the flow field processor recomputing the fluid flow, the total flux, the residual mass, the residual mass flux, the adjusted flow fields, and the concentration forecast;
    a computer programmed to execute a velocity receiver receiving velocity components if the adjusted flow fields have an absolute residual velocity above the continuity threshold; and
    a computer programmed to execute a tracer field processor performing time-dependent advection/diffusion calculation to compute the concentration forecast based on the adjusted flow fields.

9. The system as in claim 8 wherein the velocity grid point processor accesses the flow fields from a hydrodynamic circulation model, the bathymetric data, the initial concentrations, and the 2D spatial grid for the area of interest.

* * * * *